United States Patent [19]
Fukuoka et al.

[11] Patent Number: 5,541,789
[45] Date of Patent: Jul. 30, 1996

[54] MAGNETIC RECORDING APPARATUS WITH MAGNETIC HEAD ON SLIDER HAVING APPLIED LOAD LARGER THAN BUOYANT FORCE ACTING ON SLIDER SO THAT GAP BETWEEN MAGNETIC HEAD AND MAGNETIC DISK IS SMALLER THAN TOTAL THICKNESS OF PROTECTIVE LAYER AND LUBRICATING LAYER ON DISK

[75] Inventors: Hirotsugu Fukuoka, Hitachiota; Hiroshi Fukui, Hitachi; Mitsuo Suda, Odawara; Yutaka Sugita, Tokorozawa; Kanji Kawakami, Mito, all of Japan

[73] Assignee: Hitachi, Ltd., Tokyo, Japan

[21] Appl. No.: 450,148

[22] Filed: May 26, 1995

Related U.S. Application Data

[63] Continuation of Ser. No. 169,759, Dec. 20, 1993, abandoned, which is a continuation of Ser. No. 735,929, Jul. 25, 1991, abandoned.

[30] Foreign Application Priority Data

Jul. 27, 1990 [JP] Japan ..................... 2-197957

[51] Int. Cl.⁶ ................. G11B 5/48; G11B 5/60
[52] U.S. Cl. ......................... 360/103; 360/104
[58] Field of Search ..................... 360/103, 104, 360/135, 97.01–97.03, 98.01

[56] References Cited

U.S. PATENT DOCUMENTS

| | | | |
|---|---|---|---|
| 4,639,815 | 1/1987 | Arai et al. | 360/135 |
| 4,809,104 | 2/1989 | Knudsen et al. | 360/104 |
| 4,996,622 | 2/1991 | Takatsuki et al. | 360/135 |
| 5,010,429 | 4/1991 | Taguchi et al. | 360/103 |
| 5,012,367 | 4/1991 | Toensing | 360/106 |
| 5,012,369 | 4/1991 | Owe et al. | 360/104 |
| 5,027,240 | 6/1991 | Zarouri et al. | 360/104 |
| 5,027,241 | 6/1991 | Hatch et al. | 360/104 |
| 5,041,932 | 8/1991 | Hamilton | 360/104 |
| 5,047,884 | 9/1991 | Negishi et al. | 360/103 |
| 5,053,904 | 10/1991 | Yamano et al. | 360/104 |
| 5,060,097 | 10/1991 | Higuchi et al. | 360/103 |
| 5,062,017 | 10/1991 | Strom et al. | 360/103 |
| 5,072,322 | 12/1991 | Yasar et al. | 360/103 |
| 5,093,173 | 3/1992 | Nakagawa et al. | 428/64 |
| 5,097,368 | 3/1992 | Lemke et al. | 360/104 |
| 5,128,821 | 7/1992 | Takeuchi et al. | 360/103 |
| 5,212,608 | 5/1993 | Yoneoka | 360/103 |

FOREIGN PATENT DOCUMENTS

| | | |
|---|---|---|
| 62-3476 | 1/1987 | Japan . |
| 62-167681 | 7/1987 | Japan . |
| 63-306514 | 12/1988 | Japan . |

OTHER PUBLICATIONS

H. Fukuoka et al., "Evaluation of Rigid Perpendicular Magnetic Disks Using the Non–Flying Type Magnetic Head", *Technical Study Report MR89–4*, May 1989, pp. 1–7, Electronic Information Communication Society (in Japanese).

*DataFacts*, Dec. 13, 1989, 4 pages, Dataquest Inc., San Jose, CA.

*Primary Examiner*—Stuart S. Levy
*Assistant Examiner*—Jefferson Evans
*Attorney, Agent, or Firm*—Antonelli, Terry, Stout & Kraus

[57] ABSTRACT

A magnetic recording device includes a magnetic disk for storing information, a magnetic head for writing and reading information relative to the magnetic disk, a device for rotating the magnetic disk relative to the magnetic head in such a manner that speed of said magnetic disk relative to the magnetic head is 6 to 40 m/s at an innermost track of the magnetic disk, and a device for applying a load to the magnetic head so that a gap between the magnetic disk and the magnetic head disposed in opposed relation to the magnetic disk can be kept to not more than 0.1 μm.

12 Claims, 6 Drawing Sheets

MAGNETIC RECORDING APPARATUS WITH MAGNETIC HEAD ON SLIDER HAVING APPLIED LOAD LARGER THAN BUOYANT FORCE ACTING ON SLIDER SO THAT GAP BETWEEN MAGNETIC HEAD AND MAGNETIC DISK IS SMALLER THAN TOTAL THICKNESS OF PROTECTIVE LAYER AND LUBRICATING LAYER ON DISK

This application is a continuation of application Ser. No. 169,759 filed on Dec. 20, 1993, now abandoned, which is a continuation of application Ser. No. 735,929 filed on Jul. 25, 1991, now abandoned.

BACKGROUND OF THE INVENTION

This invention relates to a magnetic recording device, and more particularly to a magnetic disk device or unit of a large capacity achieving a high recording density.

A magnetic head mounted on a conventional magnetic recording device (particularly, a magnetic disk device) flies on a magnetic disk and is kept a constant distance therefrom so as to record and reproduce information. This constant distance is commonly referred to as a flying height.

Technical Study Report MR-89-4 (pages 1 to 7, May, 1989) of the Electronic Information Communication Society, as well as Datafacts published Dec. 13, 1989, by Dataquest, Inc., describe high-density recording achieved by reducing this flying height.

In the magnetic recording device disclosed in the above-mentioned prior art, the speed of the magnetic disk relative to the magnetic head is not more than 5 m/s, and in the above literature, no discussion is made with respect to the case where the relative speed of the magnetic disk is further increased. Also, the above literature discloses that the data rate to an external device is 3.5 MB/s (megabyte/second), and thus the magnetic recording device disclosed in the above literature is not suitable for use in a system required to process a large quantity of information at a high data rate. If it is intended to obtain a magnetic recording device of the type enabling a high data rate, high-density recording is limited, and if it is intended to achieve high-density recording, the data rate is lowered. These problems have been encountered.

An object of this invention is to provide a magnetic recording device which rotates a magnetic disk at a high speed, and can transfer information in accordance with a processing ability of an external device.

Another object of the invention is to provide a magnetic disk unit which achieves a high data rate and high-density recording, and has a large capacity, and is reliable.

SUMMARY OF THE INVENTION

A magnetic recording device of the present invention comprises a magnetic disk for storing information; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and means for applying a load to the magnetic head so that a gap between the magnetic disk and the magnetic head disposed in opposed relation to the magnetic disk can be kept to not more than 0.1 μm.

Preferably, the magnetic disk used in the present invention has a protective layer and a lubricating layer which are formed on a magnetic recording medium. Preferably, the magnetic disk comprises a substantially flat substrate of glass or metal having a thickness of not more than 1 mm. Preferably, in the magnetic disk used in the present invention, the thickness of the substrate is decreases from the axis of rotation of the magnetic disk toward the outer periphery thereof.

Preferably, the gap between the magnetic disk and the magnetic head is smaller than the sum of the thicknesses of the protective layer and the lubricating layer on the magnetic recording medium.

The means for rotating the magnetic disk is characterized in that it rotates the magnetic disk relative to the magnetic head in such a manner that the speed of the magnetic disk relative to the magnetic head is 6 to 40 m/s at the innermost track of the magnetic disk. Although this speed of 6 to 40 m/s is determined in accordance with the information processing ability of an external device which is to be connected to the magnetic recording device, this speed is limited by the diameter of the magnetic disk to be used, the revolution speed limit of a motor, etc. With respect to the information processing ability, a data rate of not less than 4 MB/s is desired. The practical range of the diameter of the magnetic disk to be used is not more than about 10 inches, and the practical range of the revolution speed of the magnetic disk is not more than 7200 rpm. Because of these limitations, the range of 6 to 40 m/s is preferred.

The purpose of applying the load to the magnetic head so as to keep the gap between the magnetic disk and the magnetic head opposed thereto to not more than 0.1 μm is to reduce the flying height so as to improve the density of recording on the magnetic disk. This cooperates with the above means for rotating the magnetic disk to provide a type of magnetic recording device which achieves a large capacity and a high data rate so as to be compatible with a device having a high information processing ability. Preferably, this load is at such a level as to keep the gap between the magnetic disk and the magnetic head opposed thereto constant.

Preferably, the magnetic head used in the present invention comprises a lower magnetic member formed on a substrate, an upper magnetic member which is opposed at one end thereof to the lower magnetic member through a magnetic gap and is connected at the other end thereof to the lower magnetic member so that the upper magnetic member cooperates with the lower magnetic member to form a magnetic circuit, and a conductive coil provided to pass through the magnetic circuit constituted by the upper and lower magnetic members. More preferably, the magnetic head is a thin-film magnetic head with excellent high-frequency characteristics in which the above structure is formed by a thin-film forming technique. In the case where the rotational speed of the magnetic disk is low, there are preferably provided a write-only magnetic head and a read-only magnetic head, and preferably a magneto-resistance effect element, a Hall effect element, or a magnetically sensitive transistor is used as magnetic field detection means of the read-only magnetic head.

A magnetic recording device of the present invention comprises a magnetic disk for storing information; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and means for supporting the magnetic head under a load of not more than 6 gW (grams-weight) in such a manner that the magnetic head is opposed to the magnetic disk and is urged toward the magnetic disk.

The supporting means used in the present invention is characterized in that it supports the magnetic head under a load of not more than 6 gW in such a manner that the magnetic head is opposed to the magnetic disk and is urged toward the magnetic disk. This load serves to support the magnetic head, and also serves as a source of generation of a frictional force upon contact of the magnetic head with the magnetic disk. Therefore, in order to prevent the magnetic head and the magnetic disk from being destroyed and also to ensure reliability, it is desired to reduce the load.

A magnetic recording device of the present invention comprises a magnetic disk for storing information; a magnetic head for writing and reading information relative to the magnetic disk; means for rotating the magnetic disk in accordance with a processing ability of an external device; and means for applying a load to the magnetic head so that a gap between the magnetic disk and the magnetic head disposed in opposed relation to the magnetic disk can be kept to not more than 0.1 µm.

The magnetic disk rotating means used in the present invention is characterized in that it rotates the magnetic disk in accordance with the processing ability of the external device to which the magnetic recording device of the present invention is to be connected. The data rate can be increased by increasing the rotational speed of the magnetic disk, and the rotational speed of the magnetic disk is determined in accordance with the processing ability of the external device. It is preferred that the magnetic disk rotate stably at a constant speed.

A magnetic recording device of the present invention comprises a magnetic disk for storing information; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and means for applying a load of not more than 6 gW to the magnetic head so that a gap between the magnetic disk and the magnetic head disposed in opposed relation to the magnetic disk can be kept to not more than 0.1 µm.

A magnetic recording device of the present invention comprises a magnetic disk for storing information; a magnetic head for writing and reading information relative to the magnetic disk; a support system for-supporting the magnetic head in such a manner that the magnetic head is disposed in opposed relation to the magnetic disk, the support system having a pressing portion for applying a load to the magnetic head so as to urge the magnetic head toward the magnetic disk, and a fulcrum portion supporting the pressing portion, and the fulcrum portion being more remote from the magnetic disk than the pressing portion and being disposed upstream of the pressing portion in a direction of movement of the magnetic disk; and means for rotating the magnetic disk in such a manner that the information stored in the magnetic disk can be transferred to an external device in accordance with a processing ability of the external device.

The support system used in the present invention supports the magnetic head in such a manner that the magnetic head is opposed to the magnetic disk, and also applies the load so as to urge the magnetic head toward the magnetic disk. This support system has the pressing portion for applying the load to the magnetic head, and the fulcrum portion supporting the pressing portion. The fulcrum portion is more remote from the magnetic disk than the pressing portion, and is disposed upstream of the pressing portion in the direction of movement of the magnetic disk. Preferably, the pressing portion and the fulcrum portion of the support system are rigidly connected together, and preferably the support system is in the form of a leaf spring made of a thin metal plate.

Preferably, the rigidity of the support system for holding the magnetic head is smaller in a direction perpendicular to a radial direction of the magnetic disk than in this radial direction. With this arrangement, the reliability in the support of the magnetic head is ensured as described above, and at the same time the precision of the positioning in the direction of the width of the track is ensured, and a leaf spring is preferred as described above.

A magnetic recording device of the present invention comprises a magnetic disk for storing information; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and a slider having the magnetic head mounted thereon, the surface of the slider opposed to the magnetic disk having a substantially spherical shape.

Preferably, the slider used in the present invention has such a shape as to reduce its air resistance during the rotation of the magnetic disk. Preferably, the surface of the slider opposed to the magnetic disk has a substantially spherical shape. In the case where the surface opposed to the magnetic disk is flat, it is preferred that the surface has a circular or an oval outer shape. The floating force exerted on the slider is determined by the pressure produced on the surface of the slider opposed to the magnetic disk. Therefore, in order to reduce this pressure so as to reduce the gap between the magnetic disk and the magnetic head, it is preferred to form the slider to have a smoothly curved configuration.

A magnetic recording device of the present invention comprises a magnetic disk for storing information; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and a slider having the magnetic head mounted thereon, the surface of the slider opposed to the magnetic disk having such a shape as to have a small air resistance during the rotation of the magnetic disk.

Preferably, the slider used in the present invention has a support system supporting the slider. This support system also has a pressing portion for applying a load to the slider, and a fulcrum portion supporting the pressing portion. The fulcrum portion of the support system is more remote from the magnetic disk than the pressing portion, and is disposed upstream of the pressing portion in the direction of movement of the magnetic disk.

A magnetic recording device of the present invention comprises a magnetic disk for storing information, the magnetic disk having arc-shaped grooves which are arranged at substantially equal intervals and have a depth of not less than 0.02 µm; a magnetic head for writing and reading information relative to the magnetic disk; means for rotating the magnetic disk relative to the magnetic head in such a manner that the speed of the magnetic disk relative to the magnetic head is 6 to 40 m/s at an innermost track of the magnetic disk; and means for applying a load to the magnetic head.

The magnetic disk used in the present invention is characterized in that it has the arc-shaped grooves which are arranged at substantially equal intervals and have a depth of not less than 0.02 μm. By reducing the facing area between the slider and the magnetic disk surface, the floating force exerted on the slider is reduced, so that the gap between the magnetic disk and the magnetic head is reduced. In order to reduce the above facing area, it is preferred that the magnetic disk have grooves. Particularly, when the grooves have a depth of not less than 0.02 μm, the above effect can be positively achieved.

A magnetic recording device of the present invention comprises a magnetic disk for storing information; a magnetic head for writing and reading information relative to the magnetic disk; a sealed vessel in which at least the magnetic disk and the magnetic head are sealed; and means for rotating the magnetic disk relative to the magnetic head in such a manner that the speed of the magnetic disk relative to the magnetic head is 6 to 40 m/s at an innermost track of the magnetic disk.

The sealed vessel used in the present invention seals the magnetic disk and the magnetic head. With this sealed construction, the pressure and composition of air or gas within the sealed vessel are isolated from the outside, and can be controlled. In order to reduce the gap between the magnetic disk and the magnetic head, it is preferred to decrease the internal air pressure or to use a gas (e.g. helium) which is lighter than air. Also, in order to prevent the composition of the magnetic head and the magnetic disk from being chemically changed so as to ensure reliability, it is preferred to decrease the oxygen partial pressure and to use nitrogen or an inert gas instead.

According to the present invention, the speed of the magnetic disk relative to the magnetic head which is a major factor in determining the data rate (i.e., the speed at which the recording device transfers information) can be made high, and the data rate, without being decreased, can be matched to the processing ability of the external device.

Namely, according to the present invention, the gap between the magnetic disk and the magnetic head can be reduced, so that a high-density recording can be achieved. Further, even when the large-capacity recording device is achieved, the data rate will not be lowered, and this recording device can be used in a system for processing a large quantity of information at high speed.

A magnetic recording device of a large capacity can be obtained which can achieve a data rate of not less than 4 MB/s and also can achieve a high-density recording of not less than 100 kFRPI. The gap between the magnetic head and the magnetic disk can be made smaller, and also an impact force resulting from the impingement of the slider (on which the magnetic head is mounted) on the magnetic disk can be reduced.

A magnetic disk unit is the type of magnetic recording device in which a magnetic disk is used as a magnetic recording medium. In order to record information at a high density and also to reduce the size of the device, the practical range of the diameter of the magnetic disk is not more than 10 inches, and more preferably is 3.5 to 9.5 inches.

The revolution speed of a motor for rotating the magnetic disk is preferably 1.5 times and more preferably 2.0 times larger than 3600 rpm. Therefore, in the magnetic recording device, preferably, the rotational speed of the magnetic disk is not more than about 40 m/s at the innermost track of the magnetic disk, and this is the range that can be achieved.

Generally, the magnetic head is formed on a rigid body, and distal ends of a magnetic field-generating portion and a magnetic field-detecting portion are exposed, and are opposed to the magnetic disk. This rigid body is referred to as "slider", and has two or three flat rectangular portions each called a "rail", and these flat portions define those surfaces opposed to the magnetic disk.

When the magnetic disk rotates, a flow of the air is produced between this slider and the magnetic disk so that a floating force is exerted on the slider. On the other hand, the support system applies a load to the slider in order to hold the slider at a desired position on the magnetic disk. Due to a balance between this load and the floating force, a constant gap is provided between the surface of the slider opposed to the magnetic disk and the surface of the magnetic disk.

On the other hand, for producing the magnetic disk, an underlayer and so on are laminated on a substrate, and then a magnetic recording medium is formed by coating, sputtering, vapor deposition, plating or other means, and then a protective layer and a lubricating layer are laminated on the magnetic recording medium. Therefore, the distance H between the distal end of the magnetic head and the surface of the magnetic recording medium is expressed by the following formula where Δh represents a very small step between the slider surface opposed to the magnetic disk and the distal end of the magnetic head, h represents a gap between the slider surface opposed to the magnetic disk and the surface of the magnetic disk, and t represents the sum of the thicknesses of the protective layer and the lubricating layer of the magnetic disk:

$$H=\Delta h+h+t$$

This value H is important in the magnetic recording, and the smaller the value H is, the higher the recording density is.

Namely, it is preferred that Δh, h and t be all made small.

In the present invention, even when the slider and the magnetic disk impinge on each other in the magnetic recording device in which the relative speed of the magnetic disk is 6 to 40 m/s at the innermost track of the magnetic disk, it is intended to reduce an impact resulting from this impingement, and in order to avoid damage due to the impingement, the load applied to the slider is reduced.

This impingement between the slider and the magnetic disk occurs when starting and stopping the magnetic recording device, or results from an accidental impact from the outside. An impact force produced by this impingement between the slider and the magnetic disk is attributable to the load applied to the slider. It has been found that in order to reduce this impact force so as to avoid damage, it is preferred to reduce the load.

On the other hand, the gap (h) between the slider and the magnetic disk is determined by the balance between the floating force and the load exerted on the slider. Therefore, in order to keep the gap (h) to a small value, it is also necessary to reduce the floating force exerted on the slider.

In the present invention, the load is reduced, and also the floating force exerted on the slider is reduced, thereby keeping the posture of the slider in a stable condition. By doing so, the impingement between the slider and the magnetic disk is less liable to occur, and the impact force due to the impingement is reduced.

In the present invention, the gap (h) is kept to not more than 0.1 μm which is not more than half of such a gap provided in the prior art. With this arrangement, the slider and the magnetic disk are generally in contact with each other, thereby preventing the slider and the magnetic disk from impinging upon each other. This is a comparison between the impact force due to the impingement between the slider and the magnetic disk and the sliding force due to the contact between the slider and the magnetic disk.

The present invention is the result of the inventor's discovery that under the condition in which the load and the floating force exerted on the slider are reduced, the sliding force due to the contact between the slider and the magnetic disk can be tolerated for a longer time before this sliding force causes damage.

By keeping the load on the slider to not more than 6 gW, the above result can be obtained.

With respect to the support system, its fulcrum portion is disposed more remote from the magnetic disk than its pressing portion, and also is disposed upstream of the pressing portion in the direction of movement of the magnetic disk. By doing so, the impact force and the sliding force can be reduced.

Here, the support system comprises the pressing portion connected to the slider so as to apply the load to the slider, and the fulcrum portion supporting the pressing portion. Preferably, the pressing portion is movable about the fulcrum portion.

When the slider and the magnetic disk are brought into contact with each other, the slider is subjected to a force tending to slidingly pull the slider in the direction of movement of the magnetic disk. With the above construction of the support system, the force received by the slider causes, via the pressing portion, an angular movement about the fulcrum portion. This angular movement allows the slider to escape to the downstream side in the direction of movement of the magnetic disk, and also allows the slider to move away from the magnetic disk. Namely, the sliding force due to the contact is reduced by an oblique upward movement of the slider away from the magnetic disk.

Further, the position of the slider can be stabilized by imparting anisotropy to the rigidity of the support system. As described above, the slider is relatively softly supported in the direction away from the magnetic disk, and the rigidity of the support system is increased in other directions, that is, directions parallel to the surface of the magnetic disk. By increasing the rigidity of the support system in the directions parallel to the magnetic disk surface, unnecessary vibrations do not develop in the slider, and the function of holding the magnetic head at a desired position on the magnetic disk (this is another purpose of the support system) is ensured.

With respect to the configuration of the slider, by forming the surface of the slider opposed to the magnetic disk into a spherical shape, the floating force can be reduced. This relieves the pressure produced by the air introduced between the slider and the magnetic disk, thereby reducing the floating force exerted on the slider.

Another method of obtaining similar effects is to form the outer shape of the flat portion of the slider opposed to the magnetic disk into a circular or an oval shape, or to form one end portion of the slider at the in-flow side of the magnetic disk into part of a circle or an oval, thereby reducing the floating force.

With this arrangement, the slider has such a shape as to have a small air resistance during the rotation of the magnetic disk, so that air can not be easily introduced between the slider and the magnetic disk, thereby reducing the floating force exerted on the slider.

Here, when the surface of the slider opposed to the magnetic disk is formed into a spherical shape, it is difficult to maintain the position of the magnetic head on the magnetic disk; however, this can be solved by imparting anisotropy to the rigidity of the support system as described above. Namely, the position of the slider is supported by the rigidity of the support system.

The magnetic disk is required to have the protective layer and the lubricating layer which have a sufficient strength to withstand the sliding contact with the slider. Therefore, it is necessary to increase the combined thickness (t) of the protective layer and the lubricating layer in order to increase the strength. From this viewpoint, it has been found that it is preferred that the combined thickness (t) of the protective layer and the lubricating layer should be larger than the gap (h) between the slider and the magnetic disk.

By imparting a higher degree of flatness to the substrate of the magnetic disk, the sliding force between the slider and the magnetic disk can be reduced. Namely, it is preferred that glass excellent in flatness be used as the substrate.

By reducing the thickness of the substrate so as to impart flexibility to the substrate, the impingement of the slider on the magnetic disk can be weakened. Particularly, it has been found that the thickness of the substrate is preferably not more than 1 mm. The speed of the magnetic disk is higher toward its outer periphery, and the impact force due to the impingement upon the magnetic head is higher toward the outer periphery. Therefore, preferably, the thickness is reduced gradually toward the outer periphery.

Another preferred method of reducing the floating force exerted on the slider is to form arc-shaped grooves in the magnetic disk. By doing so, the facing area between the slider and the magnetic disk is effectively reduced, thereby reducing the floating force. It has been found that the depth of the grooves is preferably not less than 0.02 μm.

Also, the flying height can be changed by controlling the gas and pressure within the magnetic recording device. For example, if helium or the like lighter than air is used as the gas, the floating force exerted on the slider is reduced as compared with the case of using air. Also, by decreasing the pressure within the magnetic recording device, the floating force can similarly be reduced. Further, it has been found that by reducing the amount of oxygen in the gas within the magnetic recording device as much as possible so that the gas is composed mainly of nitrogen or an inert gas, oxidation and change in composition of the magnetic head and the magnetic disk caused by the heat generated by the sliding contact can be restrained.

Further, by connecting the above magnetic recording device to an external device such as a computer, an information processing system can be provided. The capacity of the magnetic recording device is large, and its data rate is high, and therefore a large quantity of information can be processed at high speed.

DETAILED DESCRIPTION OF THE PREFERRED EMBODIMENTS

Figure 1:
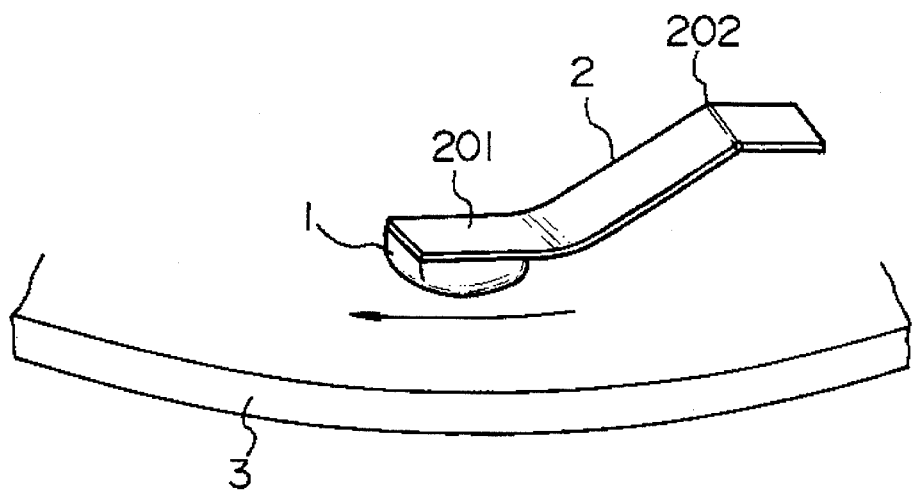
FIG. 1 is a perspective view of one embodiment of the present invention.
Figure 2:
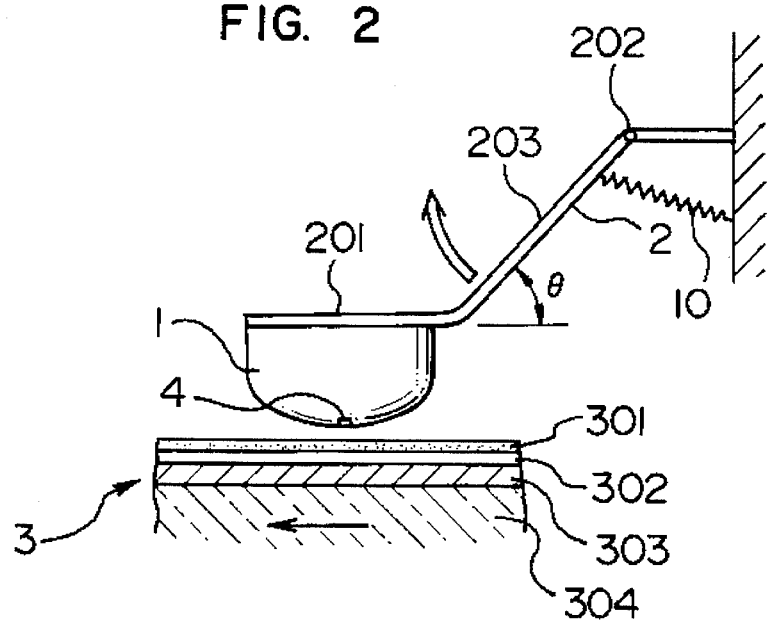
FIG. 2 is a side elevation view thereof.

One embodiment of the present invention will now be described with reference to FIGS. 1 and 2. In FIG. 1, there are shown a slider 1 with an integral magnetic head, a support system 2 supporting the slider 1, and a magnetic disk 3. The support system 2 comprises a pressing portion 201 and a fulcrum portion 202. The pressing portion 201 is connected to the slider 1, and the fulcrum portion 202 supports the pressing portion 201. FIG. 2 is a view as seen from the side of this construction. The magnetic disk 3 has a substrate 304 and a magnetic recording medium 303 on which a protective layer 302 and a lubricating layer 301 are laminated. The magnetic head 4 is embedded in the surface of the slider 1 facing the magnetic disk 3, and only the distal end of the magnetic head 4 is exposed. By a leaf spring or the like 10, the support system 2 applies a load to the slider 1 through the pressing portion 201 so as to urge the slider 1 to move about the fulcrum portion 202 toward the magnetic disk 3. Here, the fulcrum portion 202 may be defined by a leaf spring. Most preferably, the angle θ between the arm 203 interconnecting the fulcrum portion 202 and the pressing portion 201 and the magnetic disk is about 5° to about 50°. However, even if this angle is more than 50°, it is not impossible to achieve the intended purpose. Also, in the case where the magnetic disk rotates horizontally so that the slider can be placed only on the upper surface of the magnetic disk, the load may be applied only by the weight of the slider without the use of the above leaf spring.

The magnetic disk 3 rotates in the direction of the solid arrows in FIGS. 1 and 2, and the slider 1 flies on the surface of the magnetic disk 3 with a slight air gap therebetween. At this time, if the slider 1 is brought into contact with the magnetic disk 3 by some factor, the slider 1 is subjected to a force acting in the direction of rotation of the magnetic disk 3. This force is transmitted to the support system 2, so that the support system 2 is moved about the fulcrum portion 202 in the direction of the hollow arrow in FIG. 2. As a result, the slider 1 is moved in a direction away from the magnetic disk 3. Namely, the support system 2 relieves the force exerted on the slider 1 to thereby reduce the sliding force between the slider 1 and the magnetic disk 3.

Figure 3:
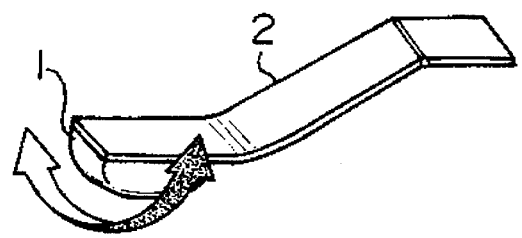
FIGS. 3 and 4 are views for explaining the rigidity of a support system.
Figure 4:
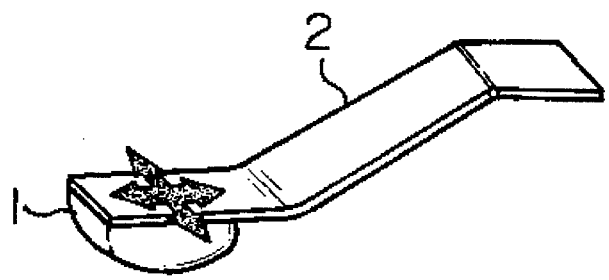

The rigidity of the support system will be described with reference to FIGS. 3 and 4. The oscillation shown in FIG. 3 is prevented by the rigidity of the support system 2 against torsion. The movement in directions parallel to the magnetic disk shown in FIG. 4 is prevented by the rigidity of the support system 2 against bending. With this arrangement, the support system 2 can hold the magnetic head 4 at a desired position over the magnetic disk 3.

Figure 5:
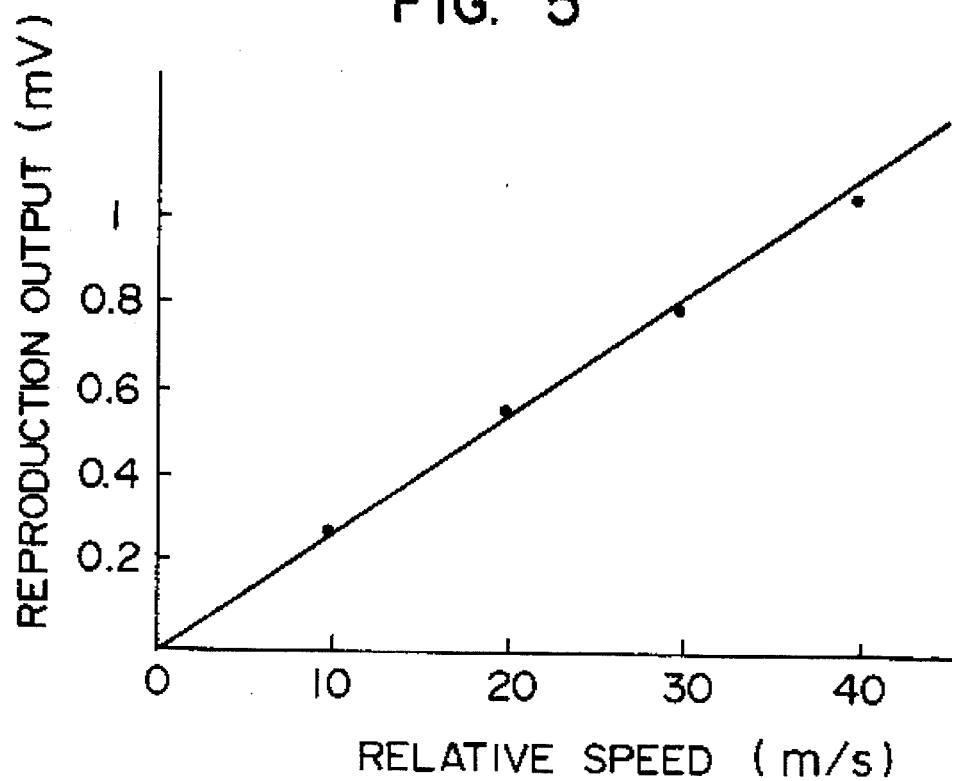
FIG. 5 is an illustration showing the relation between a relative speed and a reproduction output.

Next, the relation between the relative speed (v) of the magnetic disk 3 and the reproduction output of the magnetic head 4 is shown in FIG. 5. In this case, with respect to flux reversals recorded in the magnetic disk 3 at a rate of 10 kFRPI at the magnetic disk relative speed (v) of 10 m/s, the reproduction output of the magnetic head 4 was measured, changing the relative speed (v) of the magnetic disk 3. Here, "FRPI" means the unit of the recording density, and represents the number of flux reversals per inch. As a result, even when the relative speed (v) of the magnetic disk 3 was increased to 40 m/s, the reproduction output was increased generally in proportion to the relative speed (v) of the magnetic disk 3. When the relative speed (v) of the magnetic disk 3 was 40 m/s, the gap (h) between the slider 1 and the surface of the magnetic disk 3 was 0.07 µm.

Although reproduction was carried out for more than 2 hours while holding the magnetic head 4 at the same track, a sliding mark was not found on the magnetic disk 3 at all.

Here, the gap (h) between the slider 1 and the surface of the magnetic disk 3 was measured from the condition of floating of the slider 1 above the glass disk. The measurement method used is an optical measurement method disclosed in "Precise Measurement of Floating Characteristics of Floating Head Slider utilizing Visible Laser Interference" described on pages 839 to 847 of Report Collection (Edition C, Vol. 53, 487, March, 1987) of the Japan Society of Mechanical Engineers, or an optical measurement method disclosed in "Development of Automatic Measurement Device for Magnetic Head Floating Spacing" described in Collection of Lecture Reports (Separate Vol. 1, page 218, 1983) of the National Meeting of the Electronic Communication Society.

Figure 6:
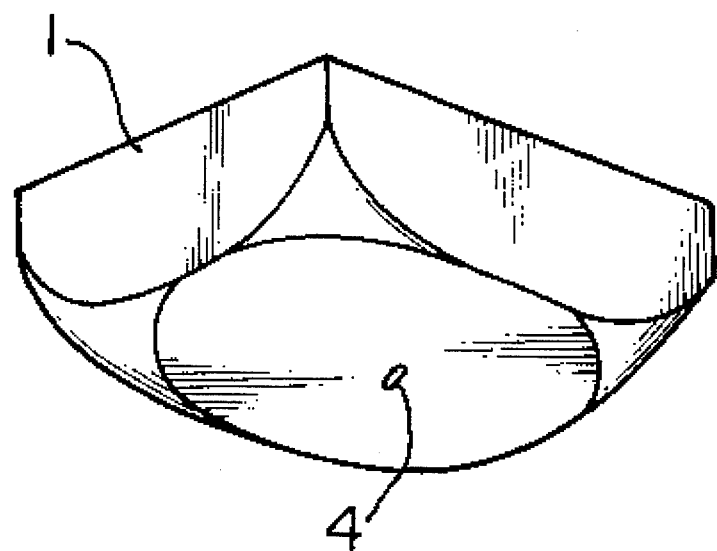
FIGS. 6, 7, 8 and 9 are views showing modified slider configurations.
Figure 7:
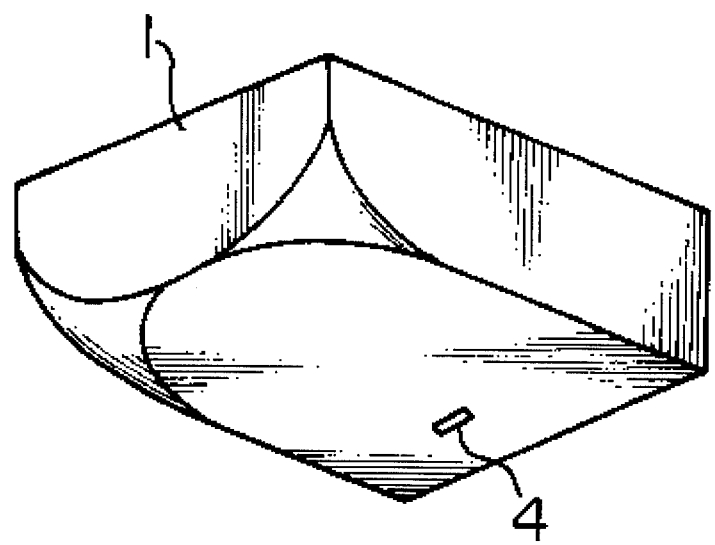

With respect to the configuration of the slider, its surface opposed to the magnetic disk has a spherical shape or a shape much like a spherical shape, as shown in FIGS. 1 and 2. Other examples of slider configuration are shown in FIGS. 6 and 7. In FIG. 6, a surface of the slider opposed to the magnetic disk is flat, and has a circular or oval outer shape. In FIG. 7, one end portion of the slider at the in-flow side of the magnetic disk has an outer shape defined by part of a parabola, a circle or an oval.

Figure 8:
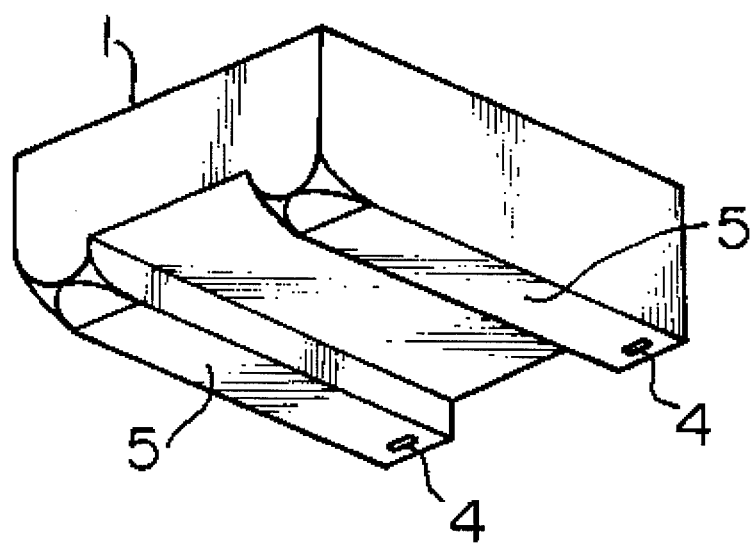
Figure 9:
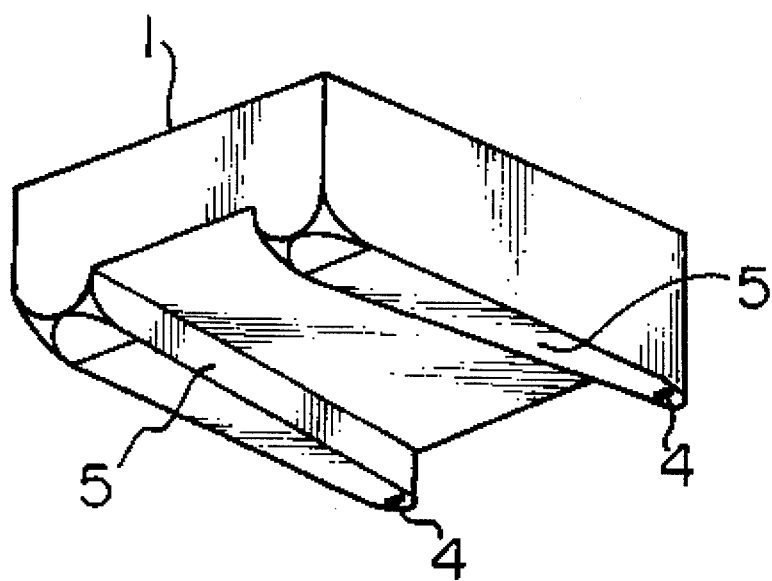

A slider of the conventional type has two rails 5, and in the present invention, as shown in FIGS. 8 and 9, the outer shape of a rail 5 may be similar to that shown in FIGS. 6 and 7.

Preferably, the magnetic disk comprises a substrate excellent in flatness so as to reduce the sliding force. A glass substrate may be suitably used.

Figure 10:
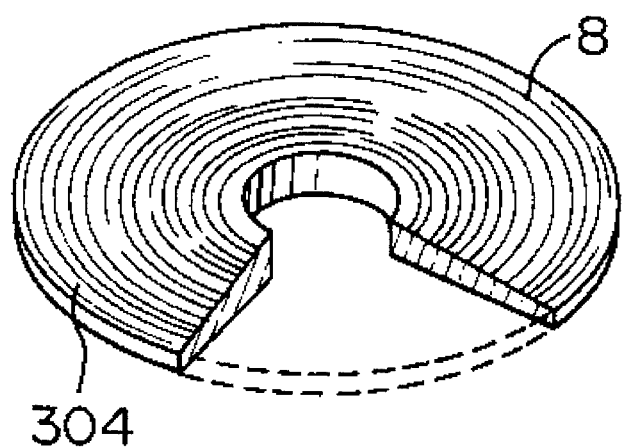
FIG. 10 is a view showing a modified magnetic disk substrate.

Also, when the substrate of the magnetic disk is made thin so as to impart flexibility to the magnetic disk, the impingement of the slider 1 on the magnetic disk 3 can be weakened. Therefore, it is preferred that the thickness of the substrate should be not more than 1 mm. Further, as shown in FIG. 10, when the substrate 304 of the magnetic disk 3 decreases in thickness progressively toward its outer periphery, this is more effective. One method of reducing the gap (H) between the distal end of the magnetic head 4 and the surface of the magnetic recording medium 303 is to form arc-shaped grooves 8 in the magnetic disk 3. With this arrangement, the floating force exerted on the slider 1 is reduced.

Figure 11:
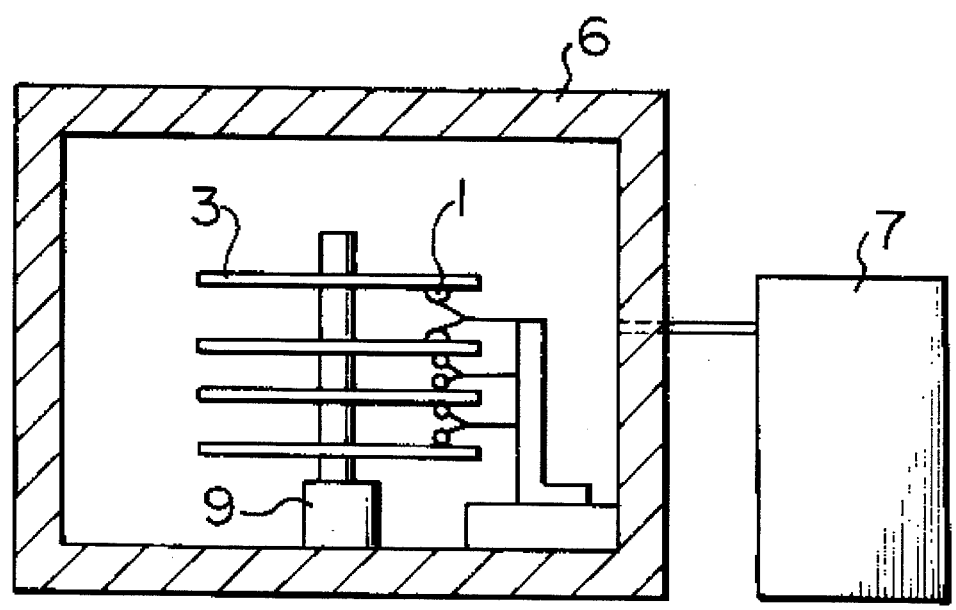
FIG. 11 is a cross-sectional side elevation view of a further embodiment utilizing a sealed vessel.

Next, FIG. 11 shows an embodiment in which the whole of a magnetic recording device is sealed within a sealed vessel. A controller 7 is provided for controlling the gas and pressure within the sealed vessel 6. When the magnetic recording device operates, the gas and pressure within the sealed vessel 6 are controlled by the controller 7 to respective predetermined values. The controller 7 also has function of disabling the recording and reproduction of information when the gas and pressure within the sealed vessel 6 are not kept at their respective predetermined values.

Figure 12:
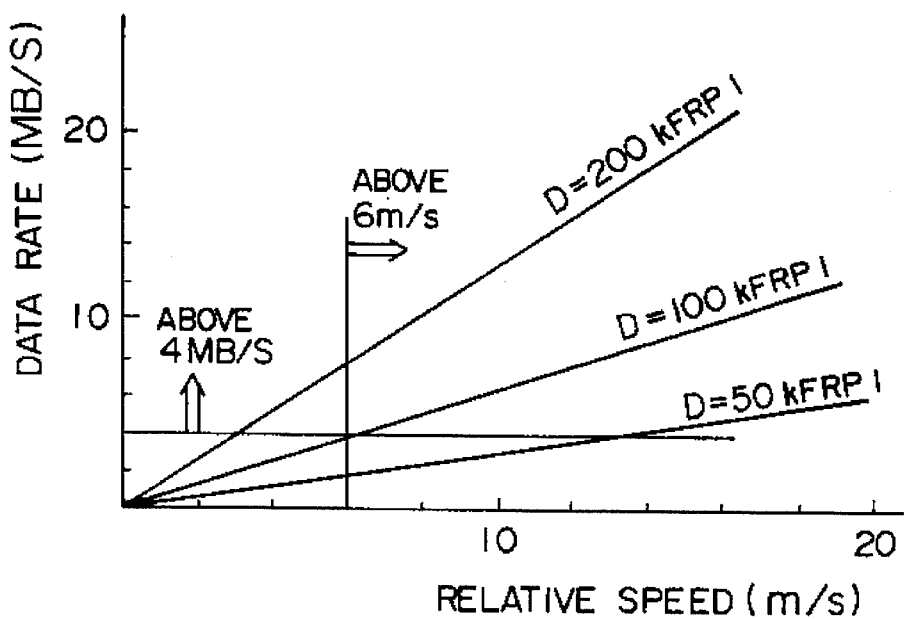
FIGS. 12 and 13 are illustrations for explaining the performance of the magnetic recording device of the present invention.
Figure 13:
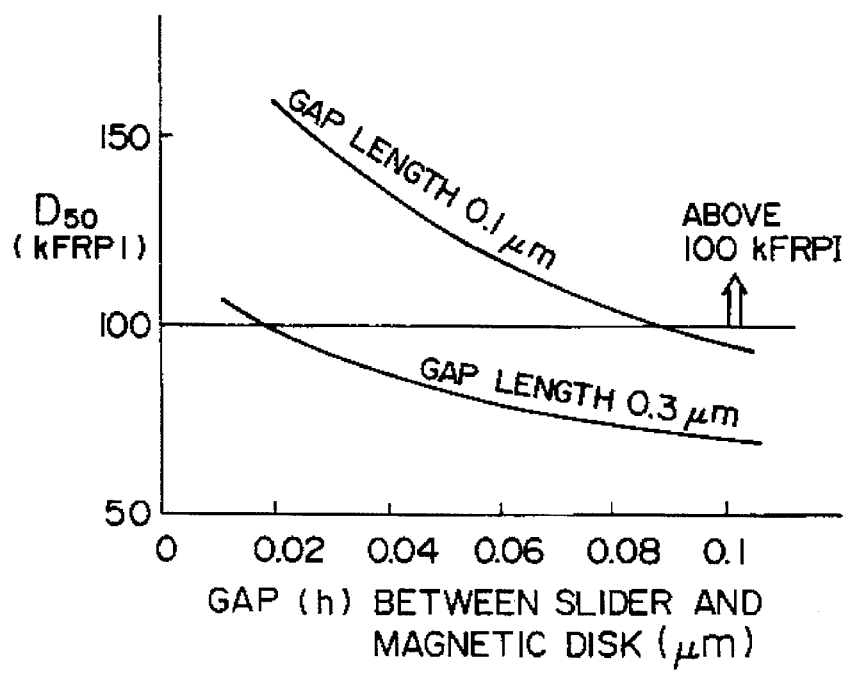

Finally, reference is made to an embodiment of a magnetic recording device connected to an external device (for example, a computer) so as to constitute an information processing system. Although the data rate is about 3 MB/s in currently-available magnetic recording devices, a higher data rate is desired in order to constitute an information processing system capable of processing a large quantity of information at high speed. FIG. 12 shows the relation between the relative speed of the magnetic disk and the data rate thereof. The recording method used here is a 1–7 code. This indicates that, assuming that the recording density is 100 kFRPI, the relative speed must be not less than 6 m/s in order to achieve a data rate of not less than 4 MB/s. On the other hand, FIG. 13 shows the relation between the gap (h) between the slider 1 and the magnetic disk 3 and the linear recording density for storing the information in the magnetic disk 3. D50 indicated on the ordinate axis represents a linear recording density which decreases the output value to half of the reproduction output value obtained at a low linear recording density. D50 is one index showing the limit of the linear recording density. Here, a longitudinal-recording thin-film medium is used as the recording medium of the magnetic disk, and the sum of the thicknesses of the protective layer and the lubricating layer is 0.01 μm. A ring-shaped magnetic head is used as the magnetic head, and the step (Δh) between the slider and the distal end of the magnetic head is 0 μm. D50 varies depending on the gap length of the magnetic head, and when the gap length is 0.1 μm, about 100 kFRPI or more can be obtained with the gap (h) of not more than 0.1 μm between the slider 1 and the surface of the magnetic disk 3. Therefore, by providing a gap (h) of not more than 0.1 μm between the slider 1 and the surface of the magnetic disk 3 at a relative speed of not less than 6 m/s, a magnetic recording device capable of achieving a data rate of not less than 4 MB/s can be provided.

Further, the magnetic disk unit is required not only to enable information to be stored at high density in the magnetic recording medium, but also to be reduced in size. Therefore, the practical range of the diameter of the magnetic disk is considered to be not more than 10 inches. Also, the revolution speed of a motor for rotating the magnetic disk is expected to be 1.5 to 2 times larger than the currently-achieved revolution speed, 3600 rpm. Therefore, in the magnetic recording device, it is thought that the relative speed (v) of up to about 40 m/s can be achieved at the innermost track of the magnetic disk.

In view of the foregoing, with the magnetic recording device of the present invention in which the relative speed is 6 m/s to not more than 40 m/s at the innermost track of the magnetic disk, and the gap (h) between the slider 1 and the surface of the magnetic disk 3 is not more than 0.1 μm, the data rate of 4 MB/s can be achieved, thereby enabling the provision of the information processing system capable of processing information at high speed. In the magnetic recording device of the above embodiment, the recording mode is not particularly limited. Namely, either of a longitudinal recording and a vertical recording may be used. Also, the kind of the magnetic head for reading and writing is not limited. Further, the recording and reproduction method is not limited, and separate write-only and read-only magnetic heads may be used. As the read-only magnetic head, any suitable magnetic detection element can be used, such as a magneto-resistance effect head, a Hall effect head and a magnetically-sensitive transistor.

According to the present invention, a magnetic recording device of a large capacity can be provided in which even if the relative speed of the magnetic disk is 6 m/s to not more than 40 m/s, the impact force produced by the impingement of the slider on the magnetic disk can be reduced, and a high reliability can be obtained.

What is claimed is:

1. A magnetic recording apparatus comprising:

a magnetic disk for storing information, said magnetic disk including a protective layer and a lubricating layer;

a magnetic head opposed to said magnetic disk for at least one of writing and reading information relative to said magnetic disk;

means for rotating said magnetic disk relative to said magnetic head in such a manner that the speed of said magnetic disk relative to said magnetic head is 6 to 40 m/s at an innermost track of said magnetic disk; and means for applying a load to said magnetic head so that a gap between said magnetic disk and said magnetic head is smaller than a total thickness of said protective layer and said lubricating layer of said magnetic disk while the speed of said magnetic disk relative to said magnetic head is 6 to 40 m/s at the innermost track of said magnetic disk, said load applying means including a fulcrum portion, a first portion supporting said magnetic head and extending substantially parallel to a surface of said magnetic disk, and a second portion connecting said first portion to said fulcrum portion and forming an angle of about 5° to about 50° with said surface of said magnetic disk.

2. A magnetic recording apparatus according to claim 1, wherein the fulcrum portion defines a rotational axis extending in a direction substantially parallel to the surface of the magnetic disk and substantially perpendicular to a direction of rotation of the magnetic disk;

wherein the second portion extends away from the fulcrum portion towards the first portion in the direction of rotation of the magnetic disk;

wherein the first portion extends away from the second portion towards the magnetic head in the direction of rotation of the magnetic disk;

wherein the second portion is connected to the fulcrum portion such that the magnetic head is able to rotate about the rotational axis defined by the fulcrum portion via the first portion and the second portion; and wherein when the magnetic head and the magnetic disk are in contact with each other while the magnetic disk is rotating, the rotation of the magnetic disk subjects the magnetic head to a force acting in the direction of rotation of the magnetic disk and tending to cause the magnetic head to move away from the surface of the magnetic disk by rotating about the rotational axis defined by the fulcrum portion via the first portion and the second portion.

3. A magnetic recording apparatus comprising:

a magnetic disk for storing information;

a magnetic head for at-least one of writing and reading information relative to said magnetic disk;

a slider having said magnetic head mounted thereon;

means for rotating said magnetic disk relative to said slider and said magnetic head in such a manner that the speed of said magnetic disk relative to said magnetic head is 6 to 40 m/s at an innermost track of said magnetic disk, the rotation of said magnetic disk generating a buoyant force acting on said slider; and means for supporting said slider under a load of not more than 6 grams-weight in such a manner that said slider and said magnetic head are opposed to said magnetic disk, said load being larger than said buoyant force acting on said slider while the speed of said magnetic disk relative to said magnetic head is 6 to 40 m/s at the innermost track of said magnetic disk such that said slider and said magnetic head are urged toward said magnetic disk while the speed of said magnetic disk relative to said magnetic head is 6 to 40 m/s at the innermost track of said magnetic disk, said supporting means including a fulcrum portion, a first portion supporting said slider and extending substantially parallel to a surface of said magnetic disk, and a second portion connecting said first portion to said fulcrum portion and forming an angle of about 5° to about 50° with said surface of said magnetic disk.

4. A magnetic recording apparatus according to claim 3, wherein the slider and the magnetic disk are in contact with each other while the speed of said magnetic disk relative to said magnetic head is 6 to 40 m/s at the innermost track of said magnetic disk.

5. A magnetic recording apparatus according to claim 3, wherein the fulcrum portion defines a rotational axis extending in a direction substantially parallel to the surface of the magnetic disk and substantially perpendicular to a direction of rotation of the magnetic disk;

wherein the second portion extends away from the fulcrum portion towards the first portion in the direction of rotation of the magnetic disk;

wherein the first portion extends away from the second portion towards the slider in the direction of rotation of the magnetic disk;

wherein the second portion is connected to the fulcrum portion such that the slider is able to rotate about the rotational axis defined by the fulcrum portion via the first portion and the second portion; and wherein when the slider and the magnetic disk are in contact with each other while the magnetic disk is rotating, the rotation of the magnetic disk subjects the slider to a force acting in the direction of rotation of the magnetic disk and tending to cause the slider to move away from the surface of the magnetic disk by rotating about the rotational axis defined by the fulcrum portion via the first portion and the second portion.

6. A magnetic recording apparatus comprising:

a magnetic disk for storing information, said magnetic disk including a protective layer and a lubricating layer;

a magnetic head opposed to said magnetic disk for at least one of writing and reading information relative to said magnetic disk;

means for rotating said magnetic disk relative to said magnetic head in such a manner that the speed of said magnetic disk relative to said magnetic head is a predetermined speed at an innermost track of said magnetic disk, the predetermined speed being determined in accordance with a processing ability of an external device; and means for applying a load to said magnetic head so that a gap between said magnetic disk and said magnetic head is smaller than a total thickness of said protective layer and said lubricating layer of said magnetic disk while the speed of said magnetic disk relative to said magnetic head is the predetermined speed at the innermost track of said magnetic disk, said load applying means including a fulcrum portion, a first portion supporting said magnetic head and extending substantially parallel to a surface of said magnetic disk, and a second portion connecting said first portion to said fulcrum portion and forming an angle of about 5° to about 50° with said surface of said magnetic disk.

7. A magnetic recording apparatus according to claim 6, wherein the fulcrum portion defines a rotational axis extending in a direction substantially parallel to the surface of the magnetic disk and substantially perpendicular to a direction of rotation of the magnetic disk;

wherein the second portion extends away from the fulcrum portion towards the first portion in the direction of rotation of the magnetic disk;

wherein the first portion extends away from the second portion towards the magnetic head in the direction of rotation of the magnetic disk;

wherein the second portion is connected to the fulcrum portion such that the magnetic head is able to rotate about the rotational axis defined by the fulcrum portion via the first portion and the second portion; and wherein when the magnetic head and the magnetic disk are in contact with each other while the magnetic disk is rotating, the rotation of the magnetic disk subjects the magnetic head to a force acting in the direction of rotation of the magnetic disk and tending to cause the magnetic head to move away from the surface of the magnetic disk by rotating about the rotational axis defined by the fulcrum portion via the first portion and the second portion.

8. A magnetic recording apparatus comprising:

a magnetic disk for storing information, said magnetic disk including a protective layer and a lubricating layer;

a magnetic head for at least one of writing and reading information relative to said magnetic disk;

a slider having said magnetic head mounted thereon, said slider being disposed such that said slider and said magnetic head are opposed to said magnetic disk;

means for rotating said magnetic disk relative to said slider and said magnetic head in such a manner that the speed of said magnetic disk relative to said magnetic head is 6 to 40 m/s at an innermost track of said magnetic disk, the rotation of said magnetic disk generating a buoyant force acting on said slider; and means for applying a load of not more than 6 gramsweight to said slider so that a gap between said magnetic disk and said magnetic head is smaller than a total thickness of said protective layer and said lubricating layer of said magnetic disk while the speed of said magnetic disk relative to said magnetic head is 6 to 40 m/s at the innermost track of said magnetic disk, said load being larger than said buoyant force acting on said slider while the speed of said magnetic disk relative to said magnetic head is 6 to 40 m/s at the innermost track of said magnetic disk.

9. A magnetic recording apparatus according to claim 8, wherein the slider and the magnetic disk are in contact with each other while the speed of said magnetic disk relative to said magnetic head is 6 to 40 m/s at the innermost track of said magnetic disk.

10. A magnetic recording apparatus according to claim 8, wherein the load applying means includes a fulcrum portion, a first portion supporting the slider and extending substantially parallel to a surface of the magnetic disk, and a second portion connecting the first portion to the fulcrum portion and forming an angle of about 5° to about 50° 1 with the surface of the magnetic disk;

wherein the fulcrum portion defines a rotational axis extending in a direction substantially parallel to the surface of the magnetic disk and substantially perpendicular to a direction of rotation of the magnetic disk;

wherein the second portion extends away from the fulcrum portion towards the first portion in the direction of rotation of the magnetic disk;

wherein the first portion extends away from the second portion towards the slider in the direction of rotation of the magnetic disk;

wherein the second portion is connected to the fulcrum portion such that the slider is able to rotate about the rotational axis defined by the fulcrum portion via the first portion and the second portion; and wherein when the slider and the magnetic disk are in contact with each other while the magnetic disk is rotating, the rotation of the magnetic disk subjects the slider to a force acting in the direction of rotation of the magnetic disk and tending to cause the slider to move away from the surface of the magnetic disk by rotating about the rotational axis defined by the fulcrum portion via the first portion and the second portion.

11. A magnetic recording apparatus comprising:

a magnetic disk for storing information;

a magnetic head for at least one of writing and reading information relative to said magnetic disk;

a slider having said magnetic head mounted thereon, said slider being disposed such that said slider and said magnetic head are opposed to said magnetic disk;

means for applying a load to said slider, said load applying means including a fulcrum portion, a first portion supporting said slider and extending substantially parallel to a surface of said magnetic disk, and a second portion connecting said first portion to said fulcrum portion and forming an angle of about 5° to about 50° with said surface of said magnetic disk; and means for rotating said magnetic disk relative to said slider and said magnetic head in such a manner that the speed of said magnetic disk relative to said magnetic head is 6 to 40 m/s at an innermost track of said magnetic disk, the rotation of said magnetic disk generating a buoyant force acting on said slider;

wherein a surface of said slider opposed to said magnetic disk has a shape effective for causing said buoyant force acting on said slider to be smaller than said load applied to said slider while the speed of said magnetic disk relative to said magnetic head is 6 to 40 m/s at the innermost track of said magnetic disk.

12. A magnetic recording apparatus according to claim 11, wherein the fulcrum portion defines a rotational axis extending in a direction substantially parallel to the surface of the magnetic disk and substantially perpendicular to a direction of rotation of the magnetic disk;

wherein the second portion extends away from the fulcrum portion towards the first portion in the direction of rotation of the magnetic disk;

wherein the first portion extends away from the second portion towards the slider in the direction of rotation of the magnetic disk;

wherein the second portion is connected to the fulcrum portion such that the slider is able to rotate about the rotational axis defined by the fulcrum portion via the first portion and the second portion; and wherein when the slider and the magnetic disk are in contact with each other while the magnetic disk is rotating, the rotation of the magnetic disk subjects the slider to a force acting in the direction of rotation of the magnetic disk and tending to cause the slider to move away from the surface of the magnetic disk by rotating about the rotational axis defined by the fulcrum portion via the first portion and the second portion.

* * * * *